United States Patent [19]
Lin et al.

[11] Patent Number: 5,551,473
[45] Date of Patent: Sep. 3, 1996

[54] THERMAL EXPANSION RELIEF VALVE

[75] Inventors: Ping Lin, Bedford, Mass.; Anthony L. Arthur, Derry, N.H.

[73] Assignee: WattsRegulator Company, Wilmington, Del.

[21] Appl. No.: 369,415

[22] Filed: Jan. 6, 1995

[51] Int. Cl.$^6$ .................................. F16K 24/02
[52] U.S. Cl. .................. 137/218; 137/59; 137/539; 137/879; 137/881
[58] Field of Search .............. 137/59, 60, 218, 137/301, 539, 879, 881

[56] References Cited

U.S. PATENT DOCUMENTS

| | | |
|---|---|---|
| 2,960,996 | 11/1960 | Haselton ........................ 137/48 X |
| 2,997,054 | 8/1961 | Woodford . |
| 3,952,770 | 4/1976 | Botnick . |
| 4,117,856 | 10/1978 | Carlson . |
| 4,182,356 | 1/1980 | Woodford ........................ 137/59 |
| 4,286,616 | 9/1981 | Botnick . |
| 4,506,694 | 3/1985 | Daghe et al. . |
| 4,909,270 | 3/1990 | Enterante, Sr. et al. . |
| 5,299,592 | 4/1994 | Swanson ........................ 137/881 X |
| 5,404,904 | 4/1995 | Glaser ........................... 137/539 |

OTHER PUBLICATIONS

Watts Regulator Brochure, "Watts 800M Pressure Vacuum Breakers", S-800, undated.
Watts Regulator Brochure, "800M4 Pressure Vacuum Breakers", S-800M4, undated.
Watts Regulator Brochure, "Series 800M3-QT/800M2-QT Anti-Siphon Pressure Vacuum Breakers", undated.
Watts Regulator Brochure, "Series 800M4-QT Anti-Siphon Pressure Vacuum Breakers", undated.

*Primary Examiner*—Gerald A. Michalsky
*Attorney, Agent, or Firm*—Fish & Richardson P.C.

[57] ABSTRACT

A fluid flow control valve, e.g. a pressure vacuum breaker, includes a thermal expansion relief valve for protecting the control valve against damage due to freezing. The control valve has a valve body of rigid material and defines a main conduit. The thermal expansion relief valve has a relief valve body mounted to the main valve and defines a relief conduit in fluid communication with the main conduit, a valve element the moves within the relief conduit between a first sealing position in engagement with a valve seat to resist flow and a second position spaced from the valve seat to allow flow from the main conduit through the relief conduit, and a spring urging the valve element toward sealing position with a predetermined force selected to exceed normal operating pressure of the main valve and to lie below pressure damaging to the main valve. A thermal expansion valve for protecting fluid flow control valves, e.g. by retrofit, is also described.

12 Claims, 3 Drawing Sheets

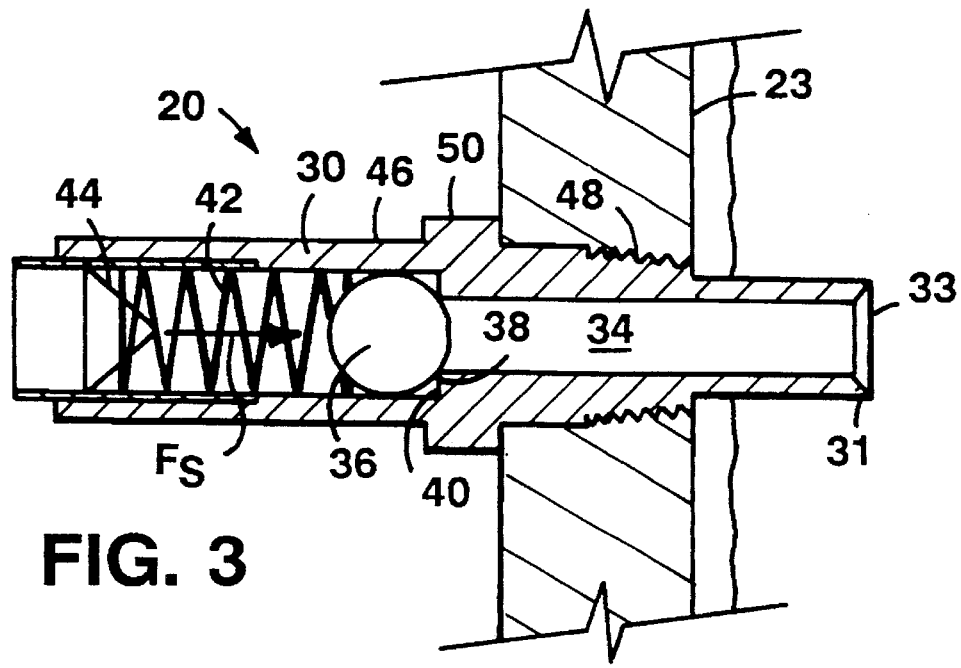
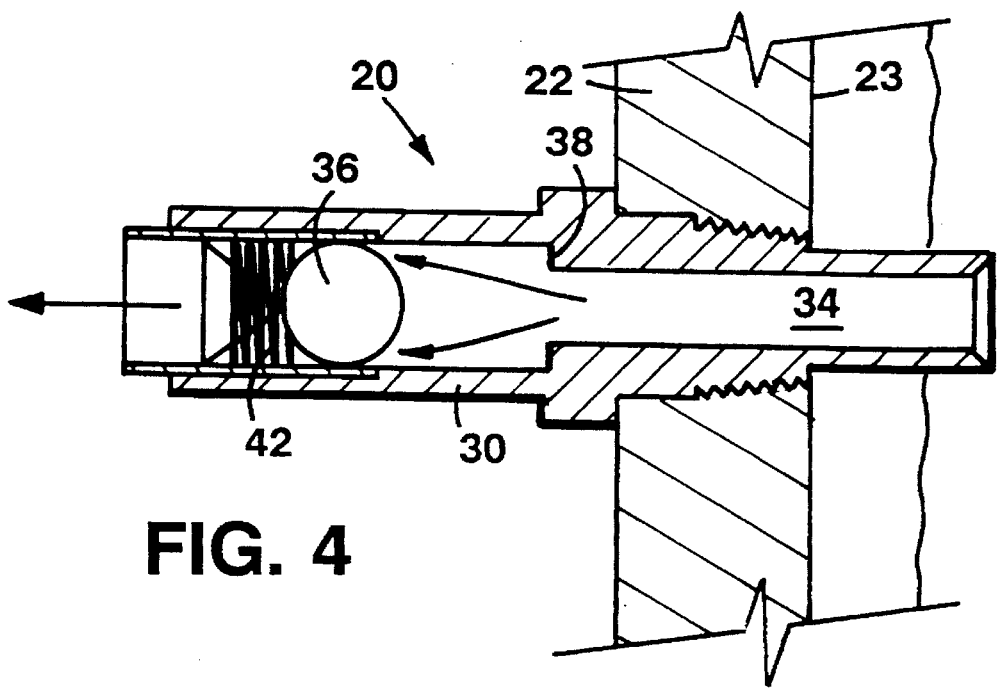

5,551,473

1

THERMAL EXPANSION RELIEF VALVE

BACKGROUND OF THE INVENTION

This invention relates to valves for protection of rigid piping elements from damage due to freezing.

Local plumbing codes often require installation of a backflow preventer and/or an anti-siphon pressure vacuum breaker at outlets to exterior piping or hoses, e.g. lawn sprinkler systems, to prevent backflow of contaminated water into a potable water supply. When these piping elements are installed outdoors, there is a risk of damage in areas subject to conditions of below freezing temperatures, in particular where freezing is not normally expected and a sprinkler system is not winterized, at the end of a growing season before a sprinkler system has been drained and winterized, or where a sprinkler system is turned on too early in the spring and a late freeze occurs.

Piping elements such as pressure vacuum breakers, backflow preventers and the like often have a body formed of bronze or other rigid material. In conditions of freezing temperature, water inside the rigid body expands as it freezes, often to a degree sufficient to cause the rigid body to split, thus requiring replacement or repair at considerable cost and inconvenience.

It has also been known to construct pressure vacuum breakers, backflow preventers and the like with a bronze body incorporating plastic elements to cushion the rigid body during freezing conditions. As a result, the plastic elements may be damaged or destroyed by expansion of water with freezing, but these destructible elements act to protect the rigid body, thus reducing the cost, but not eliminating the nuisance, of the required repair and/or replacement of the plastic elements.

SUMMARY OF THE INVENTION

According to a first embodiment of the invention, a thermal expansion relief valve is provided for protection against damage due to freezing of a fluid flow control valve comprising a main valve body of rigid material defining a main fluid flow conduit, and other components. A thermal expansion relief valve of the invention comprises a relief valve body mounted to the main valve body and defining a relief conduit in fluid communication with the main fluid-flow conduit, a valve element disposed and adapted for movement within the relief conduit between a first sealing position in engagement with a valve seat to resist fluid flow and a second position spaced from the valve seat to allow fluid flow from the main valve conduit through the relief conduit, and means for biasing, e.g. a compression spring, the valve element toward the first sealing position with a predetermined force representing a threshold pressure selected to exceed normal operating pressure of the main valve and selected to lie below pressure damaging to the main valve body and other components.

Preferred embodiments of this aspect of the invention may include one or more of the following additional features. The relief valve body has an inner end, and the relief valve body is mounted to a wall of the main valve body defining the main conduit and having an inner wall surface, the inner end of the relief valve conduit extending inwardly of the inner surface of the main valve body wall by at least a minimum predetermined distance, e.g. ⅜-inch, thereby to delay obstruction of the relief valve conduit by initiation of ice formation upon the inner wall surface. The relief valve body has an outer surface defining a region of external threads for threaded sealing engagement with an apertures defined by the main valve body and an external hexagonal flange. The threshold pressure is between 200 psi and 400 psi. The relief valve body has an inner surface defining a conduit and a shoulder defining the valve seat.

According to another aspect of the invention, a fluid flow control valve comprises a thermal expansion relief valve for protection against damage due to freezing. The fluid flow control valve comprises a main valve body of rigid material defining a main fluid-flow conduit, and other components. The thermal expansion relief valve comprises a relief valve body mounted to the main valve and defining a relief conduit in fluid communication with the main fluid-flow conduit, a valve element disposed and adapted for movement within the relief conduit between a first sealing position in engagement with a valve seat to resist fluid flow and a second position spaced from the valve seat to allow fluid flow from the main valve conduit through the relief conduit, and means for biasing, e.g. a compression spring, the valve element toward the first sealing position with a predetermined force representing a threshold pressure selected to exceed normal operating pressure of the main valve and selected to lie below pressure damaging to the main valve body and other components.

Preferred embodiments of this aspect of the invention may include one or more of the following additional features. The fluid flow control valve is a vacuum pressure breaker comprising a vent float assembly; preferably, the thermal expansion relief valve is mounted to the vent float assembly. The relief valve body has an inner end disposed to extend inwardly of an inner surface of the fluid flow control valve to which the thermal expansion valve is mounted by at least a minimum predetermined distance, e.g. ⅜-inch, thereby to delay obstruction of the relief valve conduit by initiation of ice formation upon the inner surface. The threshold pressure is between 200 psi and 400 psi. The relief valve body has an inner surface defining a conduit and a shoulder defining the valve seat. The fluid flow control valve is a reduced pressure zone valve or a double check valve.

The invention thus provides a relief valve for use with piping elements such as backflow preventers, anti-siphon pressure vacuum breakers and the like in outdoor water flow applications, e.g., lawn sprinklers, where freezing is a threat, to resist damage to the body and other rigid elements due to the increased internal pressure caused by expansion of the water during freezing.

These and other features and advantages of the invention will be apparent from the following description of a presently preferred embodiment, and from the claims.

BRIEF DESCRIPTION OF THE DRAWINGS

FIG. 3 is a side section view of the thermal expansion relief valve of the invention, shown in closed position; and FIG. 4 is a side section view of the thermal expansion relief valve of the invention, shown in open position.

DESCRIPTION OF THE PREFERRED EMBODIMENT

Figure 1:
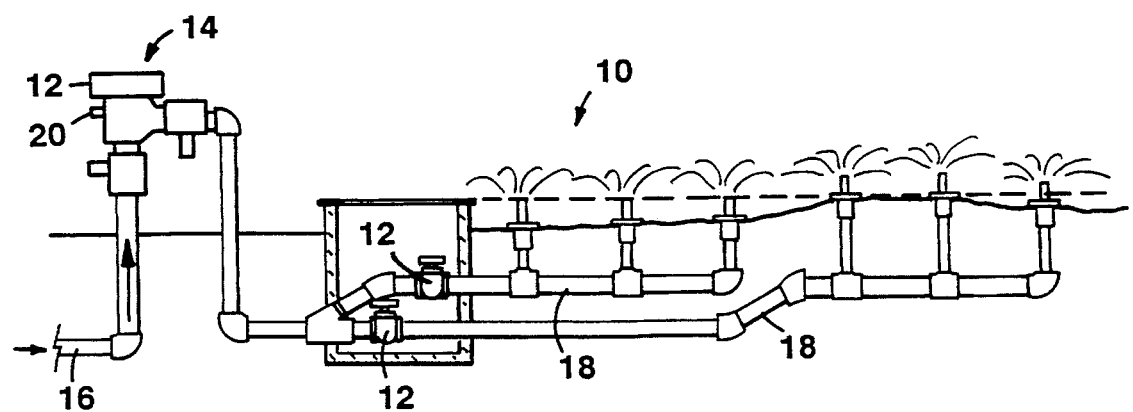
FIG. 1 is a somewhat diagrammatic representation of a water sprinkler system equipped with a fluid flow control valve having a temperature expansion relief valve of the invention.

Referring to FIG. 1, an outdoor lawn water sprinkler system 10 typically consists of an arrangement of control valves 12, including an anti-siphon pressure vacuum breaker 14, arranged close to an outlet 16, e.g. from a dwelling, and connected to a system of underground piping and lawn sprinklers 18. In regions where freezing is a threat, the pressure vacuum breakers (and/or other control valve elements) may be equipped with a thermal pressure relief valve 20 of the invention in order to resist damage to the pressure vacuum breaker (or other control valve) due to internal pressure build-up caused by the expansion of water as it freezes.

Figure 2:
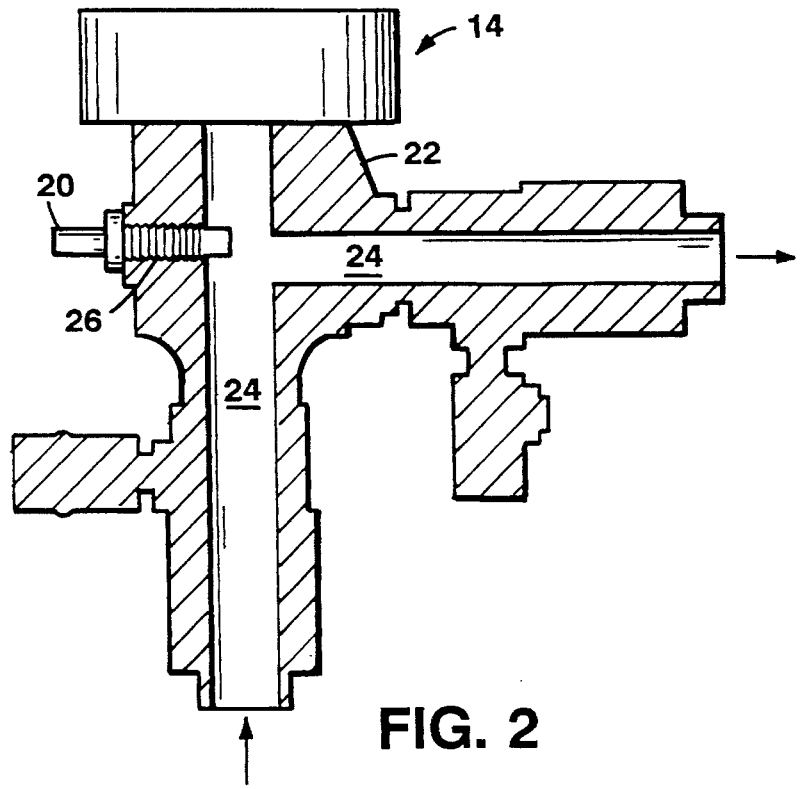
FIG. 2 is a side section view of a fluid flow control valve of FIG. 1, i.e. a pressure vacuum breaker, equipped, e.g. by retrofit, with a thermal expansion relief valve of the invention.

Referring to FIG. 2, the pressure vacuum breaker 14 has a rigid body 22, e.g. of bronze, defining a fluid-flow conduit 24 for the passage of water, and a threaded, transverse aperture 26 in fluid communication with conduit 24 through the body 22.

Thermal expansion relief valve 20 of the invention is mounted in aperture 26 and extends through the body 22, into the conduit 24.

Referring also to FIGS. 3 and 4, thermal expansion relief valve 20 includes an elongated, generally cylindrical body 30 having an inner surface 32 defining an axial relief flow conduit 34. Disposed within the conduit 34 is a spherical valve element 36 which moves within the conduit between a first sealing position (FIG. 3) in engagement with a valve seat 38 defined by a shoulder 40 of the inner surface of the body 22, and a second position (FIG. 4) spaced from engagement with the seat 38 to allow flow through the conduit 34.

A spring 42 also disposed within the conduit, and secured by a sleeve 44, biases the spherical valve element 36 toward engagement with the seat 38 with a predetermined force (arrow $F_s$) representing a threshold pressure, e.g. 200 psi, selected to provide a comfortable margin above normal operating pressure, thereby to minimize leakage, and also a margin comfortably below the pressure at which damage to the body, or other components, of the pressure vacuum breaker 14 is likely to occur.

In a preferred embodiment, the outer surface 46 of the body 30 is threaded in region 48 for sealing engagement with the threaded aperture 26 of the main body 22, and also defines an hexagonal flange 50 to facilitate placement and removal, e.g. with a wrench or socket.

In operation under normal pressure conditions, i.e. below the threshold pressure, e.g. 200 psi, the spherical valve element 36 remains in its first, sealing position, engaged upon seat 38, to prevent flow from within the main conduit 24 through the relief conduit 34, as shown in FIG. 3.

If fluid pressure exceeds the predetermined threshold pressure, e.g. as the water within main conduit 24 of the main control valve body 22 expands as it turns to ice, the spherical valve element 36 is lifted from seat 38 to allow flow of water through the body 22, thus to relieve the pressure. In the preferred embodiment, the inner end 31 of the relief valve body 30 protrudes, e.g. ⅜-inch, into the main conduit, past the inner wall 23 of the pressure vacuum breaker body, to reduce the possibility that the opening 33 of the relief valve will freeze over from ice forming on inner wall 23 before pressure is relieved.

If freezing temperatures persist, the pressure vacuum breaker 14 may freeze completely; however, a sufficient portion of the water has been released from within the vacuum breaker body 30 to protect the body and associated plastic components from damage.

Figure 5:
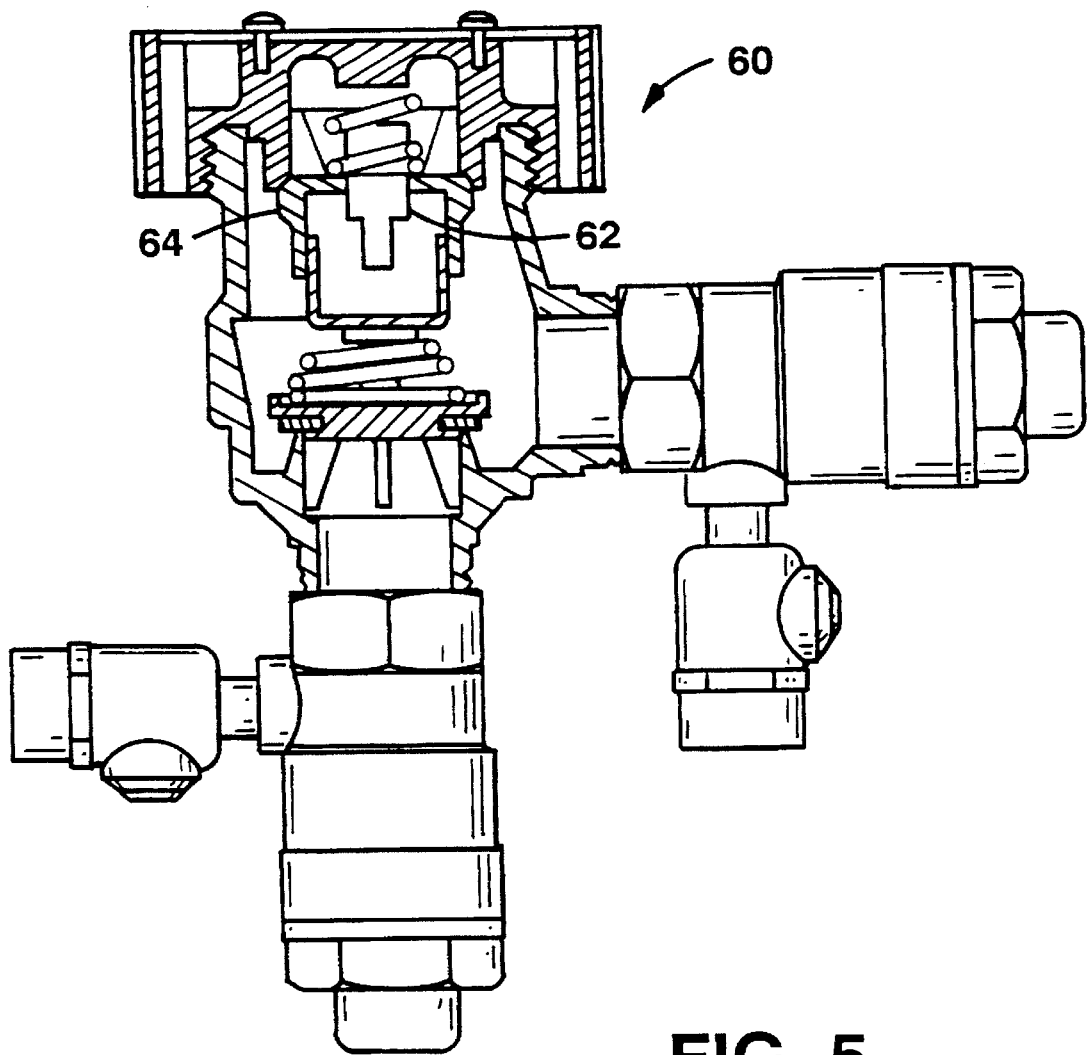
FIG. 5 is a side section view of alternate embodiment of a fluid flow control valve of FIG. 1, i.e. a pressure vacuum breaker with an integral thermal expansion relief valve of the invention.

These and other embodiments are within the following claims. For example, the body of a thermal expansion relief valve of the invention may be formed integrally with the body of a control valve element to be protected. For example, referring to FIG. 5, in a vacuum pressure valve 60, a thermal expansion valve 62 of the invention is mounted to the vent float assembly 64.

In other embodiments, the thermal expansion relief valve 20 is mounted to or integral with other types of backflow preventers e.g., a reduce pressure zone valve or a double check valve.

What is claimed is:

1. A thermal expansion relief valve for protection against damage due to freezing of fluid in a fluid flow control valve comprising a main valve body having a wall with an exterior wall surface exposed to freezing temperatures and an interior wall surface defining a main fluid flow conduit and said wall defining a central region in the main fluid flow conduit spaced from the interior wall surface, and other components, said thermal expansion relief valve comprising:

a relief valve body defining a relief conduit in fluid communication with said main fluid flow conduit, said relief conduit having an inlet located in said central region thereby to delay obstruction of said relief valve conduit by initiation of ice formation upon the interior wall surface and an outlet in fluid communication with a region exterior of said main fluid flow conduit, a valve element disposed and adapted for movement within said relief conduit between a first sealing position in engagement with a valve seat to resist fluid flow and a second position spaced from said valve seat to allow fluid flow from the main fluid flow conduit through said relief conduit, and means for biasing said valve element toward said first sealing position with a predetermined force representing a threshold pressure selected to exceed normal operating pressure of the fluid flow control valve and selected to lie below pressure damaging to the main valve body and other components.

2. The thermal expansion relief valve of claim 1, wherein said inlet of said relief valve conduit extends inwardly of the interior wall surface of the main valve body by at least about ⅜-inch.

3. The thermal expansion relief valve of claim 1, wherein said threshold pressure is between 200 psi and 400 psi.

4. The thermal expansion relief valve of claim 1, wherein said relief valve body has an inner surface defining a conduit and a shoulder defining said valve seat.

5. The thermal expansion relief valve of claim 1, wherein said means for biasing is a compression spring.

6. A fluid flow control valve comprising a thermal expansion relief valve for protection against damage due to freezing of fluid in said fluid flow control value, said fluid flow control valve comprising:

a main valve body having a wall with an exterior wall surface exposed to freezing temperatures and an interior wall surface defining a main fluid flow conduit and said wall defining a central region in said main fluid flow conduit spaced from said interior wall surface, and other components, said thermal expansion relief valve comprising:

a relief valve body defining a relief conduit in fluid communication with said main fluid flow conduit, said relief conduit having an inlet located in said central region thereby to delay obstruction of said relief valve conduit by initiation of ice formation upon the interior wall surface and an outlet in fluid communication with a region exterior of said main fluid flow conduit, a valve element disposed and adapted for movement within said relief conduit between a first sealing position in engagement with a valve seat to resist fluid flow and a second position spaced from said valve seat to allow fluid flow from the main fluid flow conduit through said relief conduit, and means for biasing said valve element toward said first sealing position with a predetermined force representing a threshold pressure selected to exceed normal operating pressure of the fluid flow control valve and selected to lie below pressure damaging to the main valve body and other components.

7. The fluid flow control valve of claim 6, wherein said control valve comprise a pressure vacuum breaker including a vent float assembly.

8. The fluid flow control valve of claim 7, wherein said thermal expansion relief valve is mounted to said vent float assembly.

9. The fluid flow control valve of claim 6 or 8, wherein said inlet of said relief valve conduit extends inwardly of the interior wall surface of the main valve body by at least about ⅜-inch.

10. The fluid flow control valve of claim 6, wherein said threshold pressure is between 200 psi and 400 psi.

11. The fluid flow control valve of claim 6, wherein said relief valve body has an inner surface defining a conduit and a shoulder defining said valve seat.

12. The fluid flow control valve of claim 6, wherein said means for biasing is a compression spring.

* * * * *

UNITED STATES PATENT AND TRADEMARK OFFICE
CERTIFICATE OF CORRECTION

PATENT NO.   : 5,551,473
DATED        : September 3, 1996
INVENTOR(S)  : Ping Lin, Anthony L. Arthur It is certified that error appears in the above-identified patent and that said Letters Patent is hereby corrected as shown below:

Col. 6, line 2, "comprise" should be --comprises--.

Signed and Sealed this

Twenty-first Day of July, 1998

Attest:

BRUCE LEHMAN

Attesting Officer

Commissioner of Patents and Trademarks

United States Patent
(12) REEXAMINATION CERTIFICATE (4311st)

Lin et al.

(10) Number: US 5,551,473 C1
(45) Certificate Issued: Apr. 17, 2001

(54) THERMAL EXPANSION RELIEF VALVE

(75) Inventors: Ping Lin, Bedford, MA (US); Anthony L. Arthur, Derry, NH (US)

(73) Assignee: Watts Regulator Company, Wilmington, DE (US)

Reexamination Request:
No. 90/005,732, May 18, 2000

Reexamination Certificate for:
Patent No.: 5,551,473
Issued: Sep. 3, 1996
Appl. No.: 08/369,415
Filed: Jan. 6, 1995

Certificate of Correction issued Jul. 21, 1998.

(51) Int. Cl.[7] ................................. F16K 24/02
(52) U.S. Cl. .................. 137/218; 137/59; 137/539; 137/879; 137/881
(58) Field of Search ............... 137/59, 218, 539, 137/879, 881

(56) References Cited

U.S. PATENT DOCUMENTS

| | | | |
|---|---|---|---|
| 4,776,362 | 10/1988 | Domingue, Sr. et al. | 137/59 |
| 5,299,592 * | 4/1994 | Swanson | 137/59 |
| 5,404,904 * | 4/1995 | Glaser | 137/539 |

* cited by examiner

Primary Examiner—Gerald A. Michalsky

(57) ABSTRACT

A fluid flow control valve, e.g. a pressure vacuum breaker, includes a thermal expansion relief valve for protecting the control valve against damage due to freezing. The control valve has a valve body of rigid material and defines a main conduit. The thermal expansion relief valve has a relief valve body mounted to the main valve and defines a relief conduit in fluid communication with the main conduit, a valve element the moves within the relief conduit between a first sealing position in engagement with a valve seat to resist flow and a second position spaced from the valve seat to allow flow from the main conduit through the relief conduit, and a spring urging the valve element toward sealing position with a predetermined force selected to exceed normal operating pressure of the main valve and to lie below pressure damaging to the main valve. A thermal expansion valve for protecting fluid flow control valves, e.g. by retrofit, is also described.

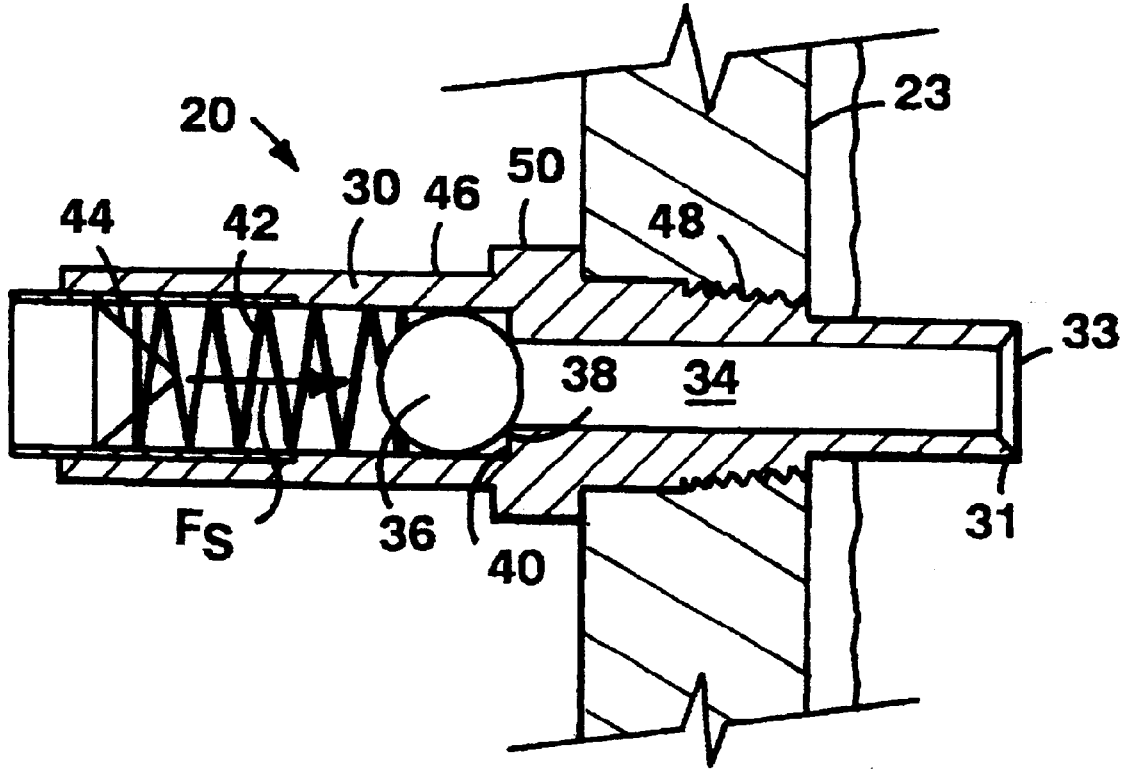

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–5 having been finally determined to be unpatentable, are cancelled.

Claim 6 is determined to be patentable as amended.

Claims 7–12, dependent on an amended claim, are determined to be patentable.

New claims 13–32 are added and determined to be patentable.

6. A fluid flow control valve comprising a thermal expansion relief valve for protection against damage due to freezing of fluid in said fluid flow control [value] *valve*, said fluid flow control valve comprising:

a main valve body having a wall with an exterior wall surface exposed to freezing temperatures and an interior wall surface defining a main fluid flow conduit and said wall defining a central region in said main fluid flow conduit spaced from said interior wall surface, and other components, said thermal expansion relief valve comprising:

a relief valve body defining a relief conduit in fluid communication with said main fluid flow conduit, said relief conduit having an inlet located in said central region thereby to delay obstruction of said relief valve conduit by initiation of ice formation upon the interior wall surface and an outlet in fluid communication with a region exterior of said main fluid flow conduit, a valve element disposed and adapted for movement within said relief conduit between a first sealing position in engagement with a valve seat to resist fluid flow and a second position spaced from said valve seat to allow fluid flow from the main fluid flow conduit through said relief conduit, and means for biasing said valve element toward said first sealing position with a predetermined force representing a threshold pressure selected to exceed normal operating pressure of the fluid flow control valve and selected to lie below pressure damaging to the main valve body and other components.

13. *The fluid flow control valve of claim 12, wherein said relief valve body includes a sleeve for housing said spring.*

14. *The fluid flow control valve of claim 6, wherein said valve element comprises a spherically shaped element.*

15. *The fluid flow control valve of claim 6, wherein said relief valve body defines said valve seat.*

16. *The fluid flow control valve of claim 15, wherein said relief valve body includes a shoulder defining said valve seat.*

17. *The fluid flow control valve of claim 6, wherein said valve element comprises a spherically shaped element and said relief valve body includes a shoulder defining said valve seat.*

18. *The fluid flow control valve of claim 6, wherein said relief valve body has an external, threaded surface.*

19. *The fluid flow control valve of claim 6, wherein said relief valve body has an external, hexagonal flange.*

20. *The fluid flow control valve of claim 6, wherein said main valve body includes a threaded opening through said wall.*

21. *The fluid flow control valve of claim 20, wherein said relief valve body has an external, threaded surface received by said threaded wall opening.*

22. *The fluid flow control valve of claim 8, wherein said threshold pressure is between 200 psi and 400 psi.*

23. *The fluid flow control valve of claim 8, wherein said relief valve body has an inner surface defining a conduit.*

24. *The fluid flow control valve of claim 8, wherein said relief valve body has a shoulder defining said valve seat.*

25. *The fluid flow control valve of claim 8, wherein said relief valve body has an inner surface defining a conduit and a shoulder defining said valve seat.*

26. *The fluid flow control valve of claim 8, wherein said means for biasing comprises a compression spring.*

27. *The fluid flow control valve of claim 26, wherein said relief valve includes a sleeve for housing said spring.*

28. *The fluid flow control valve of claim 8, wherein said valve element comprises a spherically shaped element.*

29. *The fluid flow control valve of claim 28, wherein said relief valve body defines said valve seat.*

30. *The fluid flow control valve of claim 29, wherein said relief valve body includes a shoulder defining said valve seat.*

31. *The fluid flow control valve of claim 8, wherein said relief valve body has an external, threaded surface.*

32. *The fluid flow control valve of claim 8, wherein said relief valve body has an external, hexagonal flange.*

* * * * *